United States Patent
Jeon et al.

(10) Patent No.: US 8,914,207 B1
(45) Date of Patent: Dec. 16, 2014

(54) SYSTEM AND METHOD OF CONTROLLING SHIFT FOR VEHICLE

(71) Applicants: Hyundai Motor Company, Seoul (KR); Kia Motors Corporation, Seoul (KR)

(72) Inventors: Byeong Wook Jeon, Whasung-Si (KR); Joseph D. Chang, Whasung-Si (KR); Dong Hoon Jeong, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/141,306

(22) Filed: Dec. 26, 2013

(30) Foreign Application Priority Data

May 31, 2013 (KR) .......................... 10-2013-0062802

(51) Int. Cl.
  *G06F 17/00* (2006.01)
  *F16H 61/02* (2006.01)
(52) U.S. Cl.
  CPC .................................. *F16H 61/0204* (2013.01)
  USPC ........................................................... 701/51
(58) Field of Classification Search
  None
  See application file for complete search history.

(56) References Cited

U.S. PATENT DOCUMENTS

| 2014/0277972 | A1* | 9/2014 | Jeon et al. | 701/51 |
| 2014/0297140 | A1* | 10/2014 | Jeon et al. | 701/55 |

FOREIGN PATENT DOCUMENTS

| JP | 9-184567 | 7/1997 |
| JP | 3265752 B2 | 1/2002 |
| JP | 2003-222235 A | 8/2003 |
| KR | 10-0373027 B1 | 2/2003 |
| KR | 10-0906579 B1 | 7/2009 |

* cited by examiner

*Primary Examiner* — Dirk Wright
(74) *Attorney, Agent, or Firm* — Morgan, Lewis & Bockius LLP (57) ABSTRACT

A system may include: a data detector detecting data for a shift control; and a controller determining a short term driving tendency index and a long term driving tendency index of a driver based on the data, and controlling an engine or a transmission according to the short term driving tendency index or the long term driving tendency index of the driver, wherein the controller determines a difference between the short term driving tendency index and the long term driving tendency index, and controls the shift according a corrected driving tendency index that is corrected from the long term driving tendency index when an absolute value of the difference between the short term driving tendency index and the long term driving tendency index is greater than or equal to an absolute value of a reference index difference.

13 Claims, 5 Drawing Sheets

SYSTEM AND METHOD OF CONTROLLING SHIFT FOR VEHICLE

CROSS-REFERENCE TO RELATED APPLICATION

The present application claims priority to Korean Patent Application No. 10-2013-0062802 filed on May 31, 2013, the entire contents of which is incorporated herein for all purposes by this reference.

BACKGROUND OF THE INVENTION

1. Field of the Invention

The present invention relates to a system and a method of controlling shift for a vehicle. More particularly, the present invention relates to a system and a method of controlling shift for a vehicle which can control the shift according to a corrected driving tendency index obtained by correcting a long term driving tendency of a driver if a short term driving tendency differs from the long term driving tendency of the driver.

2. Description of Related Art

Customer satisfaction related to driving performance of a vehicle depends on how precisely the vehicle runs in accordance with a tendency of the customer. While tendencies of the customers vary, however, performance characteristic of the vehicle is set to one performance characteristic in the same vehicle model. Therefore, reaction of the vehicle may not coincide with the tendency of the customer. Accordingly, the customer often lodges a complaint against the driving performance of the vehicle. That is, if the driving tendency of the customer is grasped and a shift of the vehicle is controlled to coincide with the tendency of the customer, the customer satisfaction related to the driving performance may be maximized.

Therefore, many methods of learning the driving tendency of the customer for a long time and controlling the shift according to the learned driving tendency have been developed. The method of controlling the shift according to the learned driving tendency is performed under the assumption that the driving tendency of the customer is constant. The driving tendency of the driver, however, is not constant and changes according to temporary changes of driver's feeling or driving will, road condition and so on. Therefore, the learned driving tendency may differ greatly from an actual driving tendency of the driver at one point. If the shift is controlled according to the learned driving tendency, the actual driving will of the driver may not be reflected on the shift and the driver may dissatisfy with the driving performance.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system and a method of controlling shift for a vehicle having advantages of controlling the shift according to a corrected driving tendency obtained by correcting a long term driving tendency if a short term driving tendency of a driver for a comparatively short time differs from the long term driving tendency of the driver for a comparatively long time.

A system of controlling shift for a vehicle according to an exemplary embodiment of the present invention may include a data detector detecting data for a shift control, and a controller determining a short term driving tendency index and a long term driving tendency index of a driver based on the data, and controlling an engine or a transmission according to the short term driving tendency index or the long term driving tendency index of the driver, wherein the controller determines a difference between the short term driving tendency index and the long term driving tendency index, and controls the shift according a corrected driving tendency index that is corrected from the long term driving tendency index if an absolute value of the difference between the short term driving tendency index and the long term driving tendency index is greater than or equal to an absolute value of a reference index difference.

The reference index difference may change according to the long term driving tendency index.

The corrected driving tendency index may change according to the long term driving tendency index.

A method for controlling shift for a vehicle according to another exemplary embodiment of the present invention may include detecting data for a shift control, determining a short term driving tendency index based on the data, determining a long term driving tendency index of a driver based on the short term driving tendency index of the driver, determining a difference between the short term driving tendency index and the long term driving tendency index by subtracting the long term driving tendency index from the short term driving tendency index, determining whether the difference between the short term driving tendency index and the long term driving tendency index is greater than or equal to a reference index difference if the difference between the short term driving tendency index and the long term driving tendency index is greater than or equal to 0, determining whether the long term driving tendency index is smaller than a first predetermined long term driving tendency index if the difference between the short term driving tendency index and the long term driving tendency index is greater than or equal to the reference index difference, and controlling the shift according to a first corrected driving tendency index if the long term driving tendency index is smaller than the first predetermined long term driving tendency index.

If the long term driving tendency index is greater than or equal to the first predetermined long term driving tendency index, the method may further include determining whether the long term driving tendency index is smaller than a second predetermined long term driving tendency index, and controlling the shift according to a second corrected driving tendency index if the long term driving tendency index is smaller than the second predetermined long term driving tendency index.

If the long term driving tendency index is greater than or equal to the second predetermined long term driving tendency index, the method may further include controlling the shift according to a third corrected driving tendency index.

The shift may be controlled according to the long term driving tendency index if the difference between the short term driving tendency index and the long term driving tendency index is smaller than the reference index difference.

A method for controlling shift for a vehicle according to other exemplary embodiment of the present invention may include detecting data for a shift control, determining a short term driving tendency index based on the data, determining a long term driving tendency index of a driver based on the short term driving tendency index of the driver, determining a difference between the short term driving tendency index and the long term driving tendency index by subtracting the long term driving tendency index from the short term driving tendency index, determining whether the difference between the short term driving tendency index and the long term driving tendency index is smaller than or equal to a reference index difference if the difference between the short term driving tendency index and the long term driving tendency index is smaller than 0, determining whether the long term driving tendency index is smaller than a first predetermined long term driving tendency index if the difference between the short term driving tendency index and the long term driving tendency index is smaller than or equal to the reference index difference, and controlling the shift according to a fourth corrected driving tendency index if the long term driving tendency index is smaller than the first predetermined long term driving tendency index.

If the long term driving tendency index is greater than or equal to the first predetermined long term driving tendency index, the method may further include determining whether the long term driving tendency index is smaller than a second predetermined long term driving tendency index, and controlling the shift according to a fifth corrected driving tendency index if the long term driving tendency index is smaller than the second predetermined long term driving tendency index.

If the long term driving tendency index is greater than or equal to the second predetermined long term driving tendency index, the method may further include controlling the shift according to a sixth corrected driving tendency index.

The shift may be controlled according to the long term driving tendency index if the difference between the short term driving tendency index and the long term driving tendency index is greater than the reference index difference.

The reference index difference may change according to the long term driving tendency index.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 1:
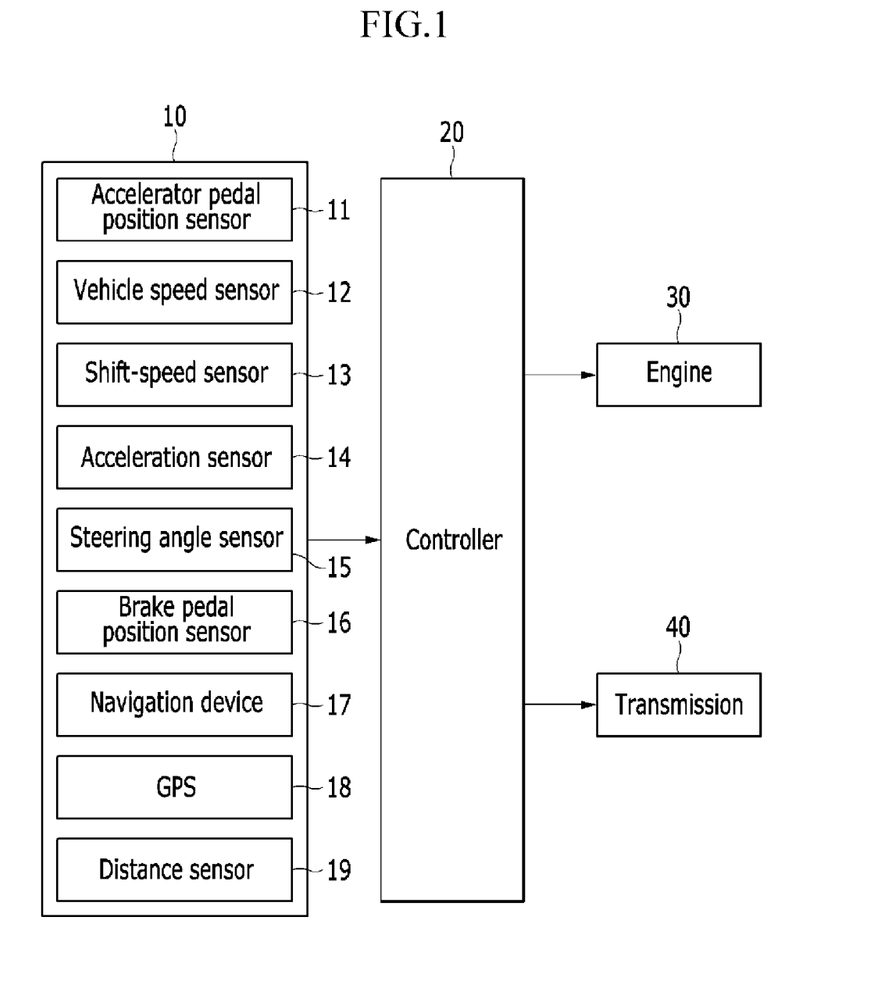
FIG. 1 is a block diagram of a system of controlling shift for a vehicle according to an exemplary embodiment of the present invention.

FIG. 1 is a block diagram of a system of controlling shift for a vehicle according to an exemplary embodiment of the present invention.

As shown in FIG. 1, a system of controlling shift for a vehicle according to an exemplary embodiment of the present invention includes a data detector 10, a controller 20, an engine 30 and a transmission 40.

The data detector 10 detects data for determining a long term driving tendency and a short term driving tendency of a driver, and the data detected by the data detector 10 is transmitted to the controller 20. The data detector 10 includes an accelerator pedal position sensor 11, a vehicle speed sensor 12, a shift-speed sensor 13, an acceleration sensor 14, a steering angle sensor 15, a brake pedal position sensor 16, a navigation device 17, a global positioning system (GPS) 18 and a distance sensor 19.

The accelerator pedal position sensor 11 detects a degree with which a driver pushes an accelerator pedal. That is, the accelerator pedal position sensor 11 detects the data related to driver's acceleration will.

The vehicle speed sensor 12 detects a vehicle speed, and is mounted at a wheel of the vehicle. On the contrary, the vehicle speed may be calculated based on a GPS signal received by the GPS 18.

Meanwhile, a target shift-speed may be calculated by using a shift pattern based on the signal of the accelerator pedal position sensor 11 and the signal of the vehicle speed sensor 12, and the shift to the target shift-speed is controlled. That is, hydraulic pressure supplied to a plurality of friction elements or released from the plurality of friction elements is controlled in an automatic transmission provided with a plurality of planetary gear sets and the plurality of friction elements. In addition, current applied to a plurality of synchronizer devices and actuators is controlled in a double clutch transmission.

The shift-speed sensor 13 detects a shift-speed that is currently engaged.

The acceleration sensor 14 detects an acceleration of the vehicle. The acceleration sensor 14 may be mounted in addition to the vehicle speed sensor 12 and may directly detect the acceleration of the vehicle, or the acceleration sensor 14 may calculates the acceleration of the vehicle by differentiating the vehicle speed detected by the vehicle speed sensor 12.

The steering angle sensor 15 detects a steering angle of the vehicle. That is, the steering angle sensor 15 detects a direction to which the vehicle runs.

The brake pedal position sensor 16 detects whether a brake pedal is pushed or not. That is, the brake pedal position sensor 16 as well as the accelerator pedal position sensor 11 detects the driver's acceleration will.

The navigation device 17 is a device which informs the driver of a route to a destination. The navigation device 17 includes an input/output portion inputting or outputting information for guidance of the route, a current position detecting portion detecting information on a current position of the vehicle, a memory in which a map data for calculating the route and a data for guiding the route are stored, and a control portion for searching the route and performing guidance of the route.

The GPS 18 receives a signal transmitted from a GPS satellite and transmits a signal corresponding thereto to the navigation device 17.

The distance sensor 19 detects a distance between the vehicle of the driver and a preceding vehicle. Various sensors such as an ultrasonic wave sensor and an infrared sensor may be used as the distance sensor 19.

The controller 20 determines the short term driving tendency and the long term driving tendency of the driver based on the data detected by the data detector 10, and calculates a difference between the short term driving tendency and the long term driving tendency. For these purposes, the controller 20 can be realized by one or more processors activated by a predetermined program, and the predetermined program can be programmed to perform each step of a method for controlling shift for a vehicle according to an exemplary embodiment of the present invention.

The controller 20 includes a short term driving tendency index calculator, a memory and a long term driving tendency index calculator.

The short term driving tendency index calculator determines the short term driving tendency of the driver for a comparatively short time based on the data detected by the data detector 10. That is, the short term driving tendency index calculator determines the driving tendency of the driver, for example, during a current driving or for a predetermined time in the current driving. The short term driving tendency of the driver may be determined based on how well one or more assumptions related to the driving tendency of the driver are satisfied, and fuzzy control theory may be used to determine the short term driving tendency of the driver. The short term driving tendency of the driver determined by the short term driving tendency index calculator is calculated as a short term driving tendency index, and the short term driving tendency index is transmitted to and is stored in the memory.

The memory stores the short term driving tendency index calculated by the short term driving tendency index calculator.

The long term driving tendency index calculator determines the long term driving tendency of the driver from a plurality of the short term driving tendency indexes stored in the memory. The long term driving tendency of the driver determined by the long term driving tendency index calculator is calculated as a long term driving tendency index.

Meanwhile, the controller 20 can determine a condition of a road on which the vehicle runs currently based on the data detected by the data detector 10. The road condition includes a specific road state such as an icy road, a slippery road, a rough road and an unpaved road, a specific road shape such as a curve road and an inclined road, and a congested degree. If the road condition shows the specific road state, the specific road shape or the congested road, it is general that the vehicle runs not according to the driving tendency of the driver but according to the road condition. Therefore, the driving tendency of the driver can be precisely calculated by not calculating the short term driving tendency of the driver under the specific road condition.

On the contrary, the short term driving tendency of the driver may be calculated under the specific road condition. In this case, a strong filter is applied to the short term driving tendency of the driver calculated under the specific road condition.

In addition, the controller 20 controls an engine 30 or a transmission 40 according to the long term driving tendency index. That is, the controller 20 may change a shift pattern, engaging feeling to the target shift-speed, an engine torque map and/or an engine torque filter according to the long term driving tendency index.

In addition, the controller 20 calculates a difference between the long term driving tendency index and the short term driving tendency index of the driver, and controls the engine 30 or the transmission 40 according to a corrected driving tendency index obtained by correcting the long term driving tendency index if the difference between the long term driving tendency index and the short term driving tendency index is large.

Hereinafter, referring to FIG. 2 to FIG. 5, the method for controlling the shift for the vehicle according to the exemplary embodiment of the present invention will be described in detail.

Figure 2:
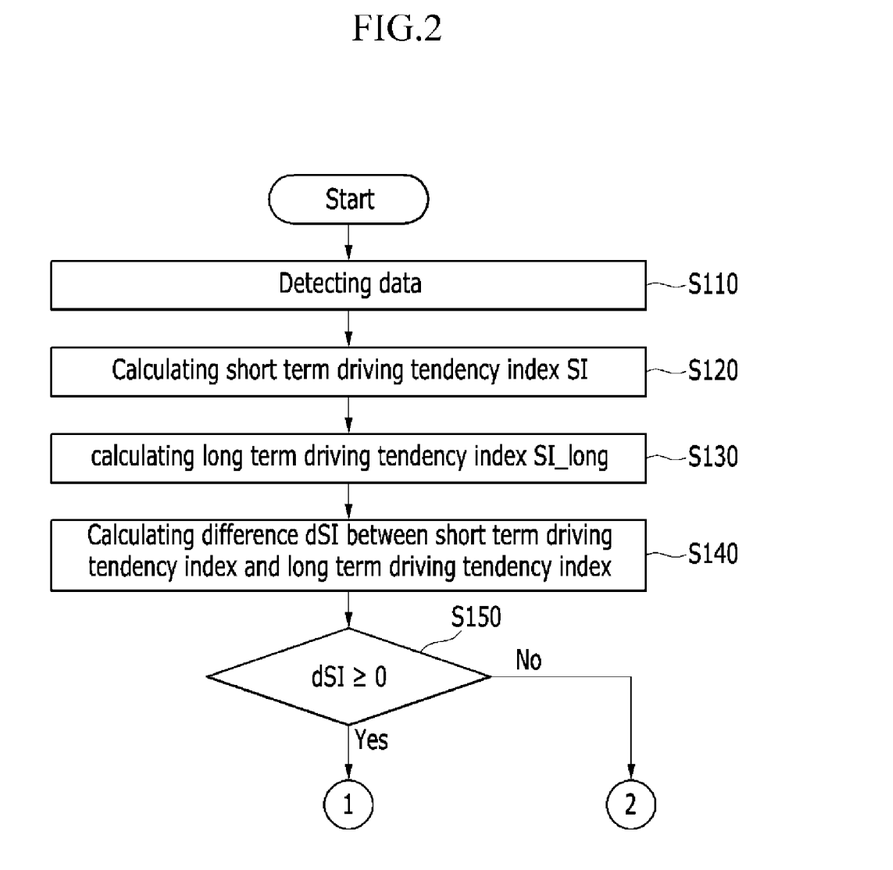
FIG. 2 to FIG. 4 are flowcharts of a method for controlling shift for a vehicle according to an exemplary embodiment of the present invention.
Figure 3:
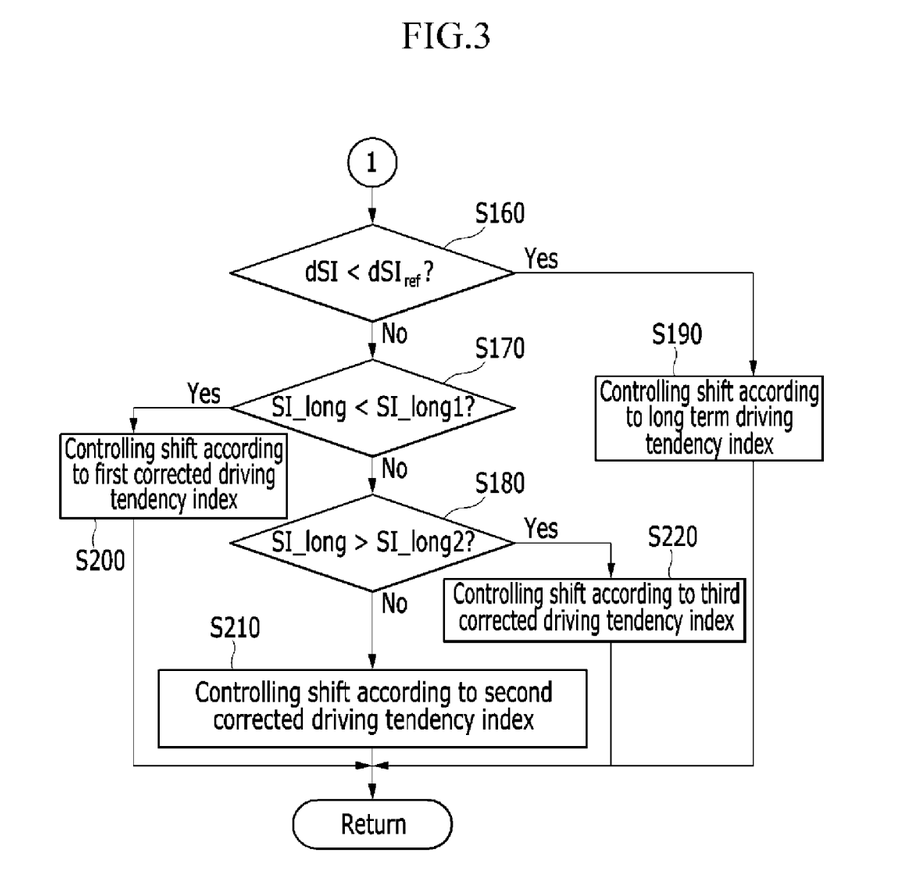
Figure 4:
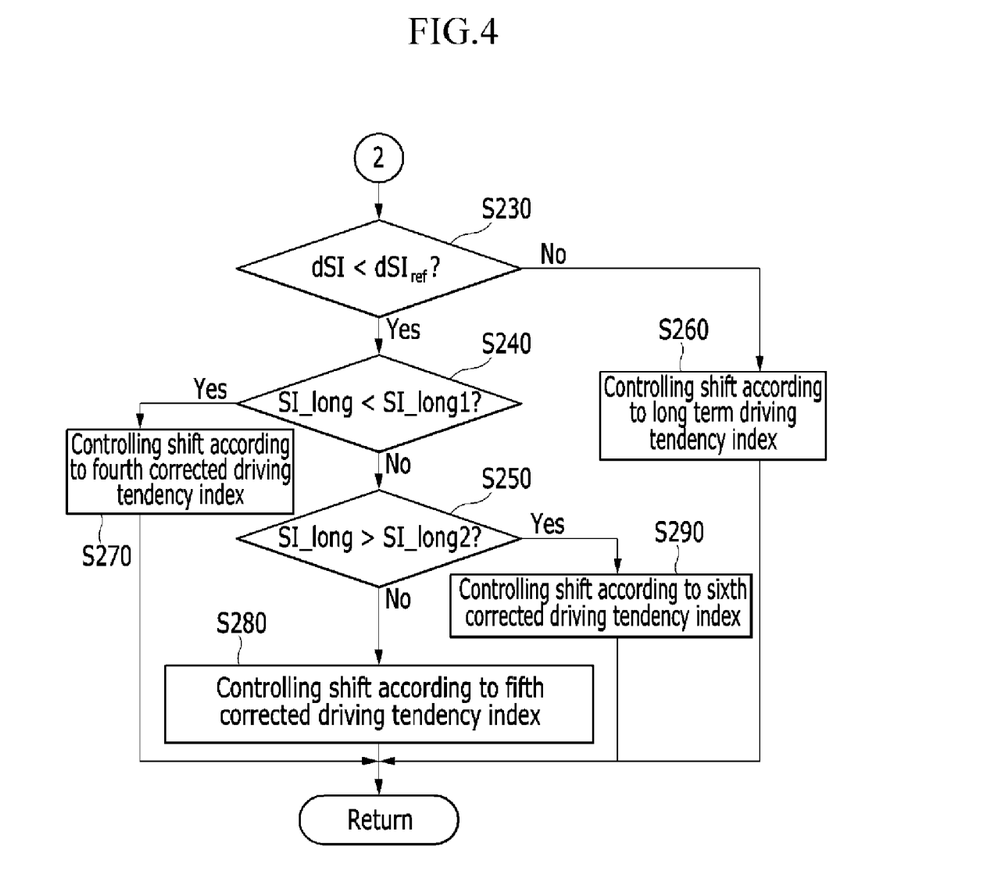
Figure 5:
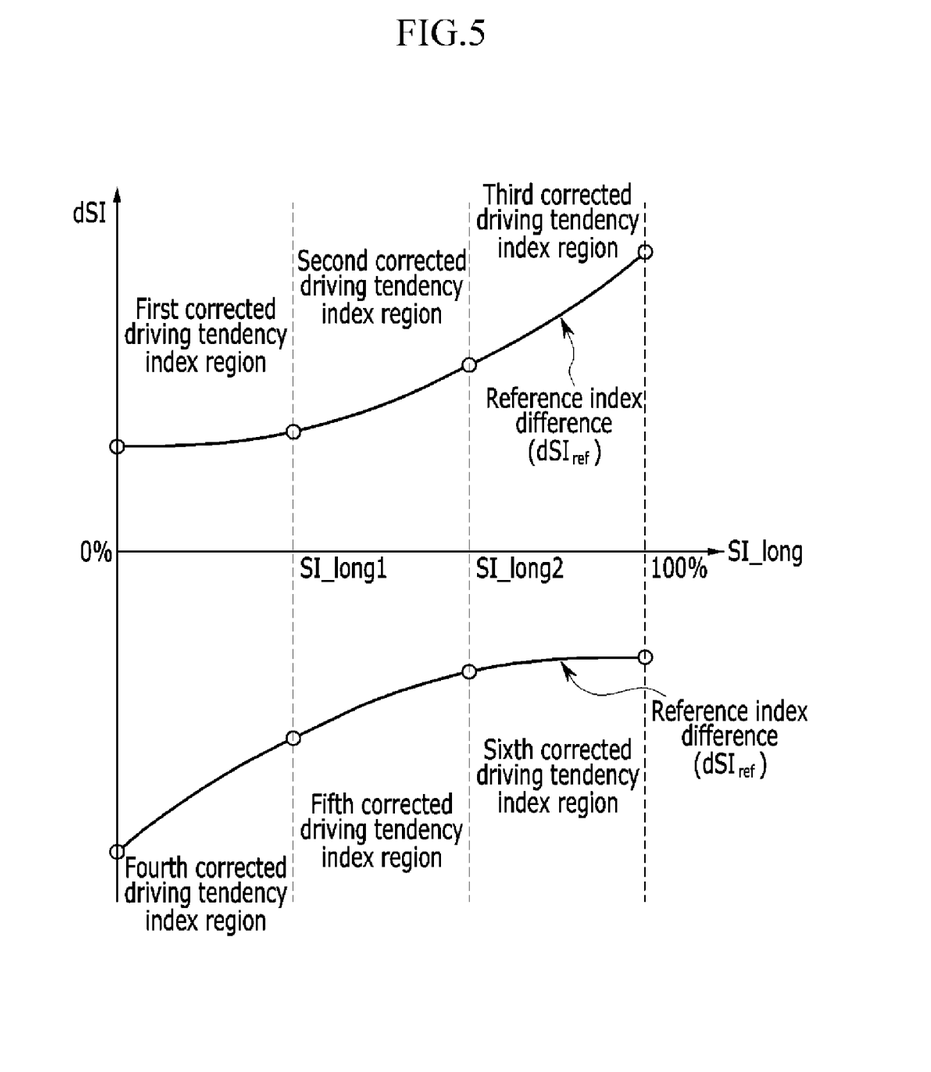
FIG. 5 is a graph illustrating a reference index difference to a long term driving tendency index.

FIG. 2 to FIG. 4 are flowcharts of a method for controlling shift for a vehicle according to an exemplary embodiment of the present invention, and FIG. 5 is a graph illustrating a reference index difference to a long term driving tendency index.

As shown in FIG. 2 to FIG. 4, the method for controlling the shift for the vehicle according to the exemplary embodiment of the present invention begins with detecting the data for the shift control at step S110.

If the data detector 10 detects and transmits the data to the controller 20, the controller 20 calculates the short term driving tendency index SI at each time at step S120. In addition, an average of the short term driving tendency indexes for a predetermined time $T_1$ is stored as the short term driving tendency index SI_Avg for the predetermined time. That is, the short term driving tendency index SI_Avg for the predetermined time is calculated by the below equation.

$$SI\_Avg = \frac{\sum_{t=t_0}^{t_0+T_1(sec)} SI}{T_1(\sec)}$$

In addition, the controller 20 calculates the long term driving tendency index SI_long from the latest n short term driving tendency indexes by the below equation at step S130.

$$SI\_long = \frac{\sum_{i=1}^{n} SI\_Avg_{n-i+1} \times W_i}{nT_1}$$

Herein, $SI\_Avg_i$ indicates i-th short term driving tendency index, and $W_i$ indicates i-th weight value. In addition, sum of the n weight values is 1, and i-th weight value is smaller than or equal to (i+1)-th weight value. The latest short term driving tendency index exercises greatest influence over the long term driving tendency index by setting the (i+1)-th weight value to be larger than or equal to the i-th weight value.

One exemplary method of calculating the short term driving tendency index and the long term driving tendency index is disclosed in this specification. Thus, it is to be understood that methods of calculating the short term driving tendency index and the long term driving tendency index are not limited to the exemplary method disclosed in this specification.

If the short term driving tendency index and the long term driving tendency index are calculated, the controller 20 calculates a difference dSI between the short term driving tendency index and the long term driving tendency index by subtracting the long term driving tendency index SI_long from the short term driving tendency index SI at step S140.

After that, the controller 20 determines whether the difference between the short term driving tendency index and the long term driving tendency index is greater than or equal to 0 at step S150.

If the difference between the short term driving tendency index and the long term driving tendency index is greater than or equal to 0, the controller 20 determines whether the difference between the short term driving tendency index and the long term driving tendency index is smaller than a reference index difference $dSI_{ref}$ at step S160. The reference index difference to the long term driving tendency index is illustrated in FIG. 5. The closer to 0% the long term driving tendency index is, the more the driver has a mild driving tendency (does not increase speed quickly) in FIG. 5. On the contrary, the closer to 100% the long term driving tendency index is, the more the driver has a sporty driving tendency (often increases speed quickly) in FIG. 5. In addition, the reference index difference changes according to the long term driving tendency index.

If the difference between the short term driving tendency index and the long term driving tendency index is smaller than the reference index difference at the step S160, the controller 20 controls the shift according to the long term driving tendency index at step S190. That is, the controller 20 changes the engine torque map and the engine torque filter according to the long term driving tendency index, and controls the engine 30 according to the changed engine torque map and the changed engine torque filter. In addition, the controller 20 changes the shift pattern and the engaging feeling to the target shift-speed according to the long term driving tendency index, and controls the transmission 40 according to the changed shift pattern and the changed engaging feeling to the target shift-speed.

If the difference between the short term driving tendency index and the long term driving tendency index is greater than or equal to the reference index difference at the step S160, the controller 20 determines whether the long term driving tendency index is smaller than a first predetermined long term driving tendency index at step S170. That is, it is determined whether the driving tendency of the driver is included in a first corrected driving tendency index region in the graph of FIG. 5.

If the long term driving tendency index is smaller than the first predetermined long term driving tendency index at the step S170, the controller 20 controls the shift according to a first corrected driving tendency index at step S200. That is, the controller 20 changes the engine torque map and the engine torque filter according to the first corrected driving tendency index, and controls the engine 30 according to the changed engine torque map and the changed engine torque filter. In addition, the controller 20 changes the shift pattern and the engaging feeling to the target shift-speed according to the first corrected driving tendency index, and controls the transmission 40 according to the changed shift pattern and the changed engaging feeling to the target shift-speed. For example, a normal shift pattern may be used, a medium degree of engaging feeling may be felt, and a normal engine torque map may be used in the first corrected driving tendency index region.

If the long term driving tendency index is greater than or equal to the first predetermined long term driving tendency index at the step S170, the controller 20 determines whether the long term driving tendency index is greater than or equal to a second predetermined long term driving tendency index at step S180. That is, it is determined whether the driving tendency of the driver is included in a third corrected driving tendency index region in the graph of FIG. 5.

If the long term driving tendency index is smaller than the second predetermined long term driving tendency index at the step S180, the controller 20 controls the shift according to a second corrected driving tendency index at step S210. That is, the controller 20 changes the engine torque map and the engine torque filter according to the second corrected driving tendency index, and controls the engine 30 according to the changed engine torque map and the changed engine torque filter. In addition, the controller 20 changes the shift pattern and the engaging feeling to the target shift-speed according to the second corrected driving tendency index, and controls the transmission 40 according to the changed shift pattern and the changed engaging feeling to the target shift-speed. For example, the normal shift pattern may be used, a high degree of engaging feeling may be felt, and an engine torque map of acceleration type may be used in a second corrected driving tendency index region.

If the long term driving tendency index is greater than or equal to the second predetermined long term driving tendency index at the step S180, the controller controls the shift according to a third corrected driving tendency index at step S220. That is, the controller 20 changes the engine torque map and the engine torque filter according to the third corrected driving tendency index, and controls the engine 30 according to the changed engine torque map and the changed engine torque filter. In addition, the controller 20 changes the shift pattern and the engaging feeling to the target shift-speed according to the third corrected driving tendency index, and controls the transmission 40 according to the changed shift pattern and the changed engaging feeling to the target shift-speed. For example, a shift pattern of acceleration type may be used, the high degree of engaging feeling may be felt, and the engine torque map of acceleration type may be used in the third corrected driving tendency index region.

Meanwhile, if the difference between the short term driving tendency index and the long term driving tendency index is smaller than 0 at the step S150, the controller 20 determines whether the difference between the short term driving tendency index and the long term driving tendency index is smaller than the reference index difference at step S230.

If the difference between the short term driving tendency index and the long term driving tendency index is greater than or equal to the reference index difference at the step S230, the controller 20 controls the shift according to the long term driving tendency index at step S260. That is, the controller 20 changes the engine torque map and the engine torque filter according to the long term driving tendency index, and controls the engine 30 according to the changed engine torque map and the changed engine torque filter. In addition, the controller 20 changes the shift pattern and the engaging feeling to the target shift-speed according to the long term driving tendency index, and controls the transmission 40 according to the changed shift pattern and the changed engaging feeling to the target shift-speed.

If the difference between the short term driving tendency index and the long term driving tendency index is smaller than the reference index difference at the step S230, the controller 20 determines whether the long term in driving tendency index is smaller than the first predetermined long term driving tendency index at step S240. That is, it is determined whether the driving tendency of the driver is included in a fourth corrected driving tendency index region in the graph of FIG. 5.

If the long term driving tendency index is smaller than the first predetermined long term driving tendency index at the step S240, the controller 20 controls the shift according to a fourth corrected driving tendency index at step S270. That is, the controller 20 changes the engine torque map and the engine torque filter according to the fourth corrected driving tendency index, and controls the engine 30 according to the changed engine torque map and the changed engine torque filter. In addition, the controller 20 changes the shift pattern and the engaging feeling to the target shift-speed according to the fourth corrected driving tendency index, and controls the transmission 40 according to the changed shift pattern and the changed engaging feeling to the target shift-speed. For example, a shift pattern of fuel economy type may be used, a low degree of engaging feeling may be felt, and an engine torque map of fuel economy type may be used in the fourth corrected driving tendency index region.

If the long term driving tendency index is greater than or equal to the first predetermined long term driving tendency index at the step S240, the controller 20 determines whether the long term driving tendency index is greater than or equal to the second predetermined long term driving tendency index at step S250. That is, it is determined whether the driving tendency of the driver is included in a sixth corrected driving tendency index region in the graph of FIG. 5.

If the long term driving tendency index is smaller than the second predetermined long term driving tendency index at the step S250, the controller 20 controls the shift according to a fifth corrected driving tendency index at step S280. That is, the controller 20 changes the engine torque map and the engine torque filter according to the fifth corrected driving tendency index, and control the engine 30 according to the changed engine torque map and the changed engine torque filter. In addition, the controller 20 changes the shift pattern and the engaging feeling to the target shift-speed according to the fifth corrected driving tendency index, and controls the transmission 40 according to the changed shift pattern and the changed engaging feeling to the target shift-speed. For example, the shift pattern of fuel economy type may be used, the low degree of engaging feeling may be felt, and the engine torque map of fuel economy type may be used in a fifth corrected driving tendency index region.

If the long term driving tendency index is greater than or equal to the second predetermined long term driving tendency index at the step S250, the controller 20 controls the shift according to a sixth corrected driving tendency index at step S290. That is, the controller 20 changes the engine torque map and the engine torque filter according to the sixth corrected driving tendency index, and controls the engine 30 according to the changed engine torque map and the changed engine torque filter. In addition, the controller 20 changes the shift pattern and the engaging feeling to the target shift-speed according to the sixth corrected driving tendency index, and controls the transmission 40 according to the changed shift pattern and the changed engaging feeling to the target shift-speed. For example, the normal shift pattern may be used, the medium degree of engaging feeling may be felt, and the normal engine torque map may be used in the sixth corrected driving tendency index region.

As described above, since the shift is controlled to coincide with the driving tendency of the driver, customer satisfaction related to driving performance may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A system of controlling shift for a vehicle, comprising:
   a data detector detecting data for a shift control; and
   a controller determining a short term driving tendency index and a long term driving tendency index of a driver based on the data, and controlling an engine or a transmission according to the short term driving tendency index or the long term driving tendency index of the driver,
   wherein the controller determines a difference between the short term driving tendency index and the long term driving tendency index, and controls the shift according a corrected driving tendency index that is corrected from the long term driving tendency index when an absolute value of the difference between the short term driving tendency index and the long term driving tendency index is greater than or equal to an absolute value of a reference index difference.

2. The system of claim 1, wherein the reference index difference changes according to the long term driving tendency index.

3. The system of claim 1, wherein the corrected driving tendency index changes according to the long term driving tendency index.

4. A method of controlling shift for a vehicle, comprising:
   detecting data for a shift control;
   determining a short term driving tendency index based on the data;
   determining a long term driving tendency index of a driver based on the short term driving tendency index of the driver;
   determining a difference between the short term driving tendency index and the long term driving tendency index by subtracting the long term driving tendency index from the short term driving tendency index;
   determining whether the difference between the short term driving tendency index and the long term driving tendency index is greater than or equal to a reference index difference when the difference between the short term driving tendency index and the long term driving tendency index is greater than or equal to 0;
   determining whether the long term driving tendency index is smaller than a first predetermined long term driving tendency index when the difference between the short term driving tendency index and the long term driving tendency index is greater than or equal to the reference index difference; and
   controlling the shift according to a first corrected driving tendency index when the long term driving tendency index is smaller than the first predetermined long term driving tendency index.

5. The method of claim 4, when the long term driving tendency index is greater than or equal to the first predetermined long term driving tendency index, further comprising:
   determining whether the long term driving tendency index is smaller than a second predetermined long term driving tendency index; and
   controlling the shift according to a second corrected driving tendency index when the long term driving tendency index is smaller than the second predetermined long term driving tendency index.

6. The method of claim 5, when the long term driving tendency index is greater than or equal to the second predetermined long term driving tendency index, further comprising controlling the shift according to a third corrected driving tendency index.

7. The method of claim 4, wherein the shift is controlled according to the long term driving tendency index when the difference between the short term driving tendency index and the long term driving tendency index is smaller than the reference index difference.

8. A method of controlling shift for a vehicle, comprising:
   detecting data for a shift control;
   determining a short term driving tendency index based on the data;
   determining a long term driving tendency index of a driver based on the short term driving tendency index of the driver;
   determining a difference between the short term driving tendency index and the long term driving tendency index by subtracting the long term driving tendency index from the short term driving tendency index;
   determining whether the difference between the short term driving tendency index and the long term driving tendency index is smaller than or equal to a reference index difference when the difference between the short term driving tendency index and the long term driving tendency index is smaller than 0;
   determining whether the long term driving tendency index is smaller than a first predetermined long term driving tendency index when the difference between the short term driving tendency index and the long term driving tendency index is smaller than or equal to the reference index difference; and
   controlling the shift according to a fourth corrected driving tendency index when the long term driving tendency index is smaller than the first predetermined long term driving tendency index.

9. The method of claim 8, when the long term driving tendency index is greater than or equal to the first predetermined long term driving tendency index, further comprising:
   determining whether the long term driving tendency index is smaller than a second predetermined long term driving tendency index; and
   controlling the shift according to a fifth corrected driving tendency index when the long term driving tendency index is smaller than the second predetermined long term driving tendency index.

10. The method of claim 9, when the long term driving tendency index is greater than or equal to the second predetermined long term driving tendency index, further comprising controlling the shift according to a sixth corrected driving tendency index.

11. The method of claim 8, wherein the shift is controlled according to the long term driving tendency index when the difference between the short term driving tendency index and the long term driving tendency index is greater than the reference index difference.

12. The method of claim 4, wherein the reference index difference changes according to the long term driving tendency index.

13. The method of claim 8, wherein the reference index difference changes according to the long term driving tendency index.

* * * * *